US011649791B2

(12) United States Patent
Williams et al.

(10) Patent No.: US 11,649,791 B2
(45) Date of Patent: May 16, 2023

(54) PRECLEANER

(71) Applicant: Vortexair LTD, Swansea (GB)

(72) Inventors: Mark Williams, Swansea (GB);
Darren Pearce, Swansea (GB)

(73) Assignee: Vortexair LTD, Swansea (GB)

( * ) Notice: Subject to any disclaimer, the term of this patent is extended or adjusted under 35 U.S.C. 154(b) by 25 days.

(21) Appl. No.: 17/271,897

(22) PCT Filed: Aug. 23, 2019

(86) PCT No.: PCT/EP2019/072632
§ 371 (c)(1),
(2) Date: Feb. 26, 2021

(87) PCT Pub. No.: WO2020/043631
PCT Pub. Date: Mar. 5, 2020

(65) Prior Publication Data
US 2021/0190018 A1 Jun. 24, 2021

(30) Foreign Application Priority Data

Aug. 28, 2018 (GB) ...................................... 1813963

(51) Int. Cl.
*B01D 45/12* (2006.01)
*F02M 35/022* (2006.01)
(Continued)

(52) U.S. Cl.
CPC ......... *F02M 35/0223* (2013.01); *B01D 45/12* (2013.01); *F02M 35/084* (2013.01); *B04C 5/14* (2013.01); *B04C 11/00* (2013.01)

(58) Field of Classification Search
CPC .... F02M 35/0223; F02M 35/084; B04C 5/14; B04C 11/00; B01D 45/12
See application file for complete search history.

(56) References Cited

U.S. PATENT DOCUMENTS 3,816,982 A * 6/1974 Regnault ................ B01D 50/20
55/432
4,572,783 A * 2/1986 Watson .................. B04C 11/00
210/512.1
(Continued)

FOREIGN PATENT DOCUMENTS

EP          2 199 585 A1     6/2010
JP          2007136288 A  *  6/2007
(Continued)

OTHER PUBLICATIONS

International Search Report and Written Opinion on PCT/EP2019/072632 dated Nov. 14, 2019.

*Primary Examiner* — Dung H Bui
(74) *Attorney, Agent, or Firm* — Foley & Lardner LLP

(57) ABSTRACT

A precleaner for use in an air intake system is described, the precleaner comprises a cyclone which defines a volume, the cyclone comprising an inlet and an outlet. The inlet and the outlet are arranged to generate a vortex within the volume of the cyclone when the air pressure at the outlet is lower than the air pressure at the inlet. The cyclone further comprises an aperture. The precleaner further comprises a blocking member arranged to move and concomitantly occlude the aperture only when the air pressure at the outlet is lower than the air pressure at the inlet. An air intake system comprising the precleaner is also disclosed.

17 Claims, 1 Drawing Sheet

Figure 1:
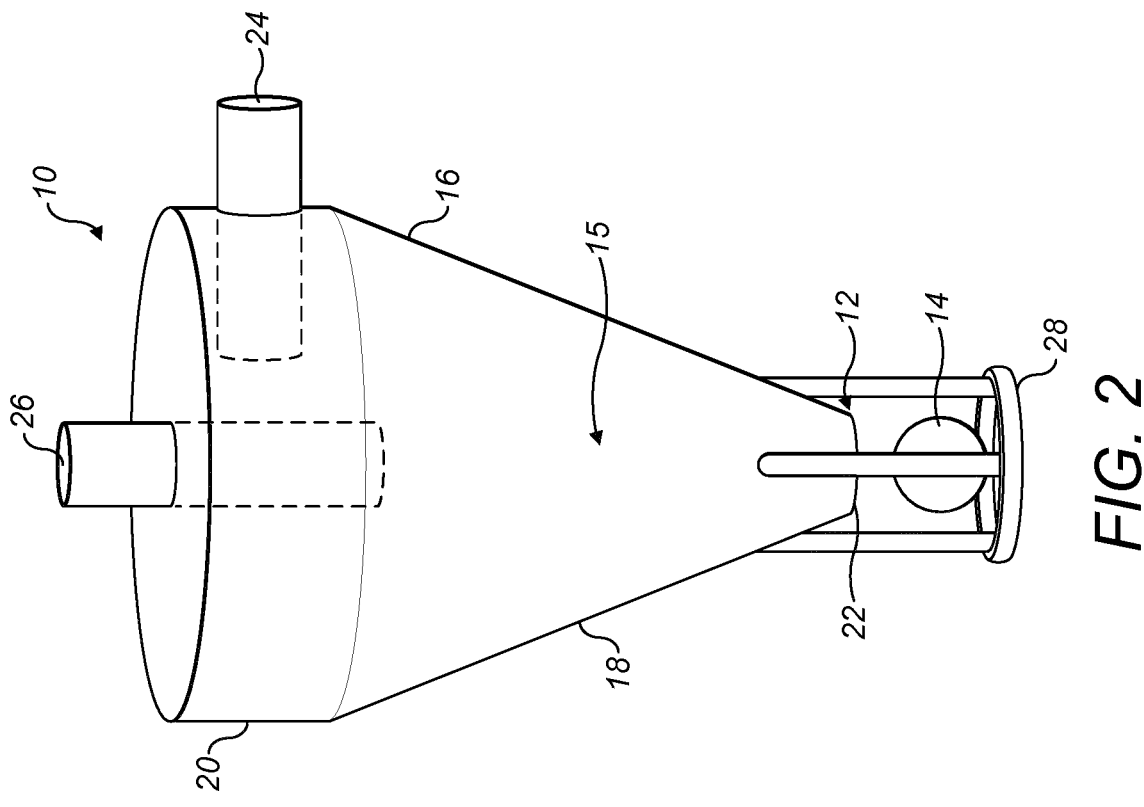

(51) Int. Cl.
*F02M 35/08* (2006.01)
*B04C 5/14* (2006.01)
*B04C 11/00* (2006.01)

(56) References Cited

U.S. PATENT DOCUMENTS

| | | | |
|---|---|---|---|
| 5,725,104 A * | 3/1998 | Walraven | D21D 5/24 |
| | | | 209/733 |
| 6,179,904 B1 * | 1/2001 | Knowles | B01D 45/06 |
| | | | 55/360 |
| 2003/0000508 A1 | 1/2003 | Takahashi et al. | |
| 2010/0065669 A1 * | 3/2010 | Coles | A23L 17/60 |
| | | | 241/39 |
| 2015/0143997 A1 * | 5/2015 | Deutschmeyer | B01D 46/10 |
| | | | 96/417 |
| 2016/0169165 A1 | 6/2016 | Isogai | |

FOREIGN PATENT DOCUMENTS

| | | | | |
|---|---|---|---|---|
| KR | 20110045676 A * | 5/2011 | | B04C 11/00 |
| KR | 20130012278 A | 2/2013 | | |
| KR | 101844923 B1 | 4/2018 | | |
| WO | WO-95/14535 A1 | 6/1995 | | |
| WO | WO-0203844 A1 * | 1/2002 | | A47L 9/1608 |
| WO | WO-2015/059781 A1 | 4/2015 | | |

* cited by examiner

PRECLEANER

CROSS-REFERENCE TO RELATED APPLICATIONS

This application is a U.S. National Stage Application under 35 U.S.C. § 371 of International Patent Application No. PCT/EP2019/072632, filed on Aug. 23, 2019, which claims priority to GB Patent Application No. 1813963.4, filed on Aug. 28, 2018, the disclosure of each of which is incorporated herein by reference in its entirety.

FIELD OF THE INVENTION

The present invention relates to a precleaner for use in an air intake system, and more particularly to a self-cleaning precleaner.

BACKGROUND TO THE INVENTION

The air taken into internal combustion engines is typically filtered to remove particulate matter such as debris, dust, dirt, insects, pollen, mould and bacteria before it is mixed with the fuel in the engine. This filtration of the air ensures that particulates and debris does not enter the engine, preventing damage to the internal surface of the engine and assisting in prolonging the working life of the engine as a whole.

Air filters often undertake such filtration. Air filters typically comprise porous or fibrous materials, as these materials are ideal for filtering the air drawn into internal combustion engines. These porous or fibrous materials act as a physical barrier that traps the particulates or debris from making their way further into the system and potentially into the engine.

However, as air filters are a physical barrier, over time they can become partially or entirely blocked by particulate matter filtered from the air. When an air filter becomes blocked, airflow into the engine is limited, concomitantly reducing the efficiency of the engine. As such, regular maintenance, inspection, cleaning or replacement of air filters is required to ensure an engine remains operating at peak efficiency.

One method of increasing the lifespan of physical barrier air filters to provide what is known as a precleaner or pre-cleaner as part of the air intake system. Precleaners are typically positioned such that incoming air passes through them before subsequently passing through the air filter. Precleaners usually aim to remove a significant proportion of the particulate matter in the air before it passes through a subsequent air filter. Therefore, the general aims of any precleaner are to increase the longevity of the following air filter and to improve fuel efficiency by maintaining the required airflow to the engine.

Many precleaners are designed to utilise centrifugal forces to remove particulate matter from the air drawn into an engine. One problem with current precleaner technology is that the systems require moving parts to rotate at speed to separate the particulate matter from the air. Precleaners of this nature are prone to becoming stiff or damaged by particulate matter working itself into the rotating mechanism. Where a precleaner has stiff moving parts, this can lead to excessive wear and an increase in resistance to rotation which can reduce fuel efficiency.

Many state-of-the-art precleaners are also designed to collect and accumulate the particulate matter removed from the air in a reservoir or tank which needs to be cleaned and emptied at regular intervals. Self-cleaning precleaners have been developed to reduce the problem of cleaning and emptying, these systems typically using a system of aspiration (or scavenging) to self-clean. Aspiration involves supplying a secondary airflow, frequently from the exhaust, to remove the particulate matter accumulated by the precleaner. However, systems of this nature are undesirable as they require complicated plumbing systems in tight spaces to supply the secondary airflow, increasing the cost and complexity of such solutions.

Objects and aspects of the present claimed invention seek to alleviate at least these problems of the prior art.

SUMMARY OF THE INVENTION

According to a first aspect of the present claimed invention, there is claimed a precleaner for use in an air intake system, the precleaner comprising a cyclone defining a volume, the cyclone comprising an inlet and an outlet, the inlet and the outlet arranged to generate a vortex within the volume when the air pressure at the outlet is lower than the air pressure at the inlet, the cyclone further comprising an aperture, and the precleaner further comprising a blocking member arranged to move and concomitantly occlude the aperture when the air pressure at the outlet is lower than the air pressure at the aperture.

In this way, there is advantageously provided a self-cleaning, low-maintenance precleaner for use in an air intake system of an engine. The blocking aperture is only occluded when there is a pressure difference between the aperture and outlet. As such, when the engine fed by the air intake system including the precleaner is switched off and is not consuming air, the aperture is not occluded by the blocking member as the pressure at the outlet and aperture will be substantially the same.

The aperture provides fluid communication between the internal volume of the cyclone and the exterior of the cyclone. As such, when the blocking member does not occlude the aperture, a substantial amount of the particulate matter separated from the air by the precleaner can egress from the precleaner through the aperture. This egress of the particulate matter when the engine is switched off results in the precleaner of the present claimed invention being self-cleaning.

The present claimed invention is advantageous as the described precleaner can be easily maintained at a lower cost than the precleaners of the prior art. Furthermore, the precleaner of this invention is low maintenance as the separation of particulate matter from the air intake does not require moving parts.

Preferably, in use, the present claimed invention is installed in the air intake system such that the aperture is located below the inlet and the outlet. Preferably, in use, the precleaner is installed in an air intake system such that the aperture is lower and closer to the ground than the outlet and the inlet.

Preferably, the cyclone comprises a substantially conical portion. More preferably, the cyclone comprises a substantially frustoconical portion. Preferably, the frustoconical portion is the largest portion of the cyclone. Preferably, the cross-section of the cyclone along its longitudinal axis is substantially circular. Preferably, the cross-section of the frustoconical portion along its longitudinal axis is substantially circular. Preferably, the cross-sectional area of the frustoconical portion decreases linearly along its longitudinal axis.

Preferably, the aperture is substantially circular. Preferably, the aperture is located on the frustum of the frustoconical portion. Preferably, the entire frustum is the aperture. Preferably, the frustum and aperture lie in a plane substantially perpendicular to the longitudinal axis of the frustoconical portion. Preferably, the aperture lies in a plane substantially parallel to the base of the frustoconical portion. Preferably, the plane occupied by the aperture is substantially perpendicular to the longitudinal axis of the cyclone.

Preferably, the aperture is located on the longitudinal axis of the cyclone, such that the longitudinal axis of the cyclone extends through the aperture. Preferably, the aperture is centrally aligned with the longitudinal axis of the cyclone. Preferably, the aperture is located on the longitudinal axis of the frustoconical portion, such that the longitudinal axis of the frustoconical portion extends through the aperture. Preferably, the aperture is centrally aligned with the longitudinal axis of the frustoconical portion.

Preferably, the outlet is located on the longitudinal axis of the cyclone, such that the longitudinal axis of the cyclone extends through the outlet. Preferably, the outlet is centrally aligned with the longitudinal axis of the cyclone. Preferably, the outlet is located on the longitudinal axis of the frustoconical portion, such that the longitudinal axis of the frustoconical portion extends through the outlet. Preferably, the outlet is centrally aligned with the longitudinal axis of the frustoconical portion.

Preferably, the aperture and the outlet are located on opposite sides of the cyclone. More preferably, the aperture and outlet are located at opposing ends of the cyclone. Preferably, the aperture is located proximate the frustum of the frustoconical portion, and the outlet is located proximate the base of the frustoconical portion.

Preferably, the inlet is located such that it is offset from the longitudinal axis of the cyclone. Preferably, the inlet is located such that it is offset from the longitudinal axis of the frustoconical portion. Preferably, the inlet is orientated such that its longitudinal axis is perpendicular to the longitudinal axis of the cyclone. Preferably, the inlet is orientated such that its longitudinal axis is perpendicular to the longitudinal axis of the frustoconical portion.

Preferably, the blocking member is arranged to move and concomitantly occlude the aperture when the air pressure at the outlet is lower than the air pressure at the aperture under the influence of air passing through the aperture. Air passes through the aperture as the air pressure inside the volume of the cyclone is lower than the air pressure of external to the volume of the cyclone.

Preferably, the blocking member is arranged to completely occlude the aperture when air pressure at the outlet is lower than the air pressure at the aperture. More preferably, the obscuration of the aperture by the blocking member is substantially airtight. Preferably, when the aperture is occluded by the blocking member, the blocking member abuts the entire perimeter of the aperture to form an airtight seal.

Preferably, the blocking member is located outside the volume of the cyclone. Preferably, the blocking member is completely located outside the volume of the cyclone until the blocking member occludes the aperture when a portion of the blocking member protrudes into the volume of the cyclone. Preferably, the protruding portion of the blocking member is a curved surface of the blocking member.

Preferably, the blocking member is held proximate to the aperture by a cage which surrounds the aperture. Preferably, the cage is located outside of the volume of the cyclone. Preferably, the interior of the cage has a volume less than three times the volume of the blocking member.

Preferably, the longitudinal axis of the cage is parallel to the longitudinal axis of the cyclone. More preferably, the cage is dimensioned such that its longitudinal axis is parallel to the longitudinal axis of the cyclone and perpendicular to the plane occupied by the aperture.

Preferably, the blocking member has a curved surface. Preferably, the curved surface of the blocking member is configured to abut the aperture. Preferably, the blocking member is substantially spherical. More preferably, the blocking member is a ball.

Preferably, the cyclone comprises a cylindrical portion. Preferably, the cyclone comprises a frustoconical portion and a cylindrical portion. Preferably, the cylindrical portion comprises a planar base. Preferably the cylindrical portion extends from the widest part of the frustoconical portion.

Preferably, the inlet and the outlet are located on the cylindrical portion of the cyclone. Preferably, the inlet is located on the curved side wall of the cylindrical portion. Preferably, the outlet is located on the planar base of the cylindrical portion.

Preferably, the inlet and the outlet are substantially perpendicular to one another. Preferably, the inlet and the outlet comprise tubes which extend into the volume of the cyclone. Preferably, the inlet tube does not extend past the central axis of the cylindrical portion. More preferably, the outlet tube extends into the volume of the cyclone to a position which is closer to the aperture than the inlet tube. Preferably, the terminus of the outlet tube is closer to the frustum of the frustoconical portion than the terminus of the inlet tube.

According to a second aspect of the present claimed invention, there is claimed a precleaner for use in an air intake system, the precleaner comprising a cyclone defining a volume, the cyclone comprising an inlet and an outlet, the inlet and the outlet arranged to generate a vortex within the volume when the air pressure at the outlet is lower than the air pressure at the inlet, the cyclone further comprising an aperture, and the precleaner further comprising a blocking member arranged to move and concomitantly occlude the aperture when the air pressure at the outlet is lower than the air pressure at the inlet.

Preferably, the blocking member is arranged to move and concomitantly occlude the aperture when the air pressure at the outlet is lower than the air pressure at the inlet under the influence of air passing through the aperture.

According to a third aspect of the present claimed invention, an air intake system comprising the precleaner as detailed above is provided.

DETAILED DESCRIPTION

Figure 2:
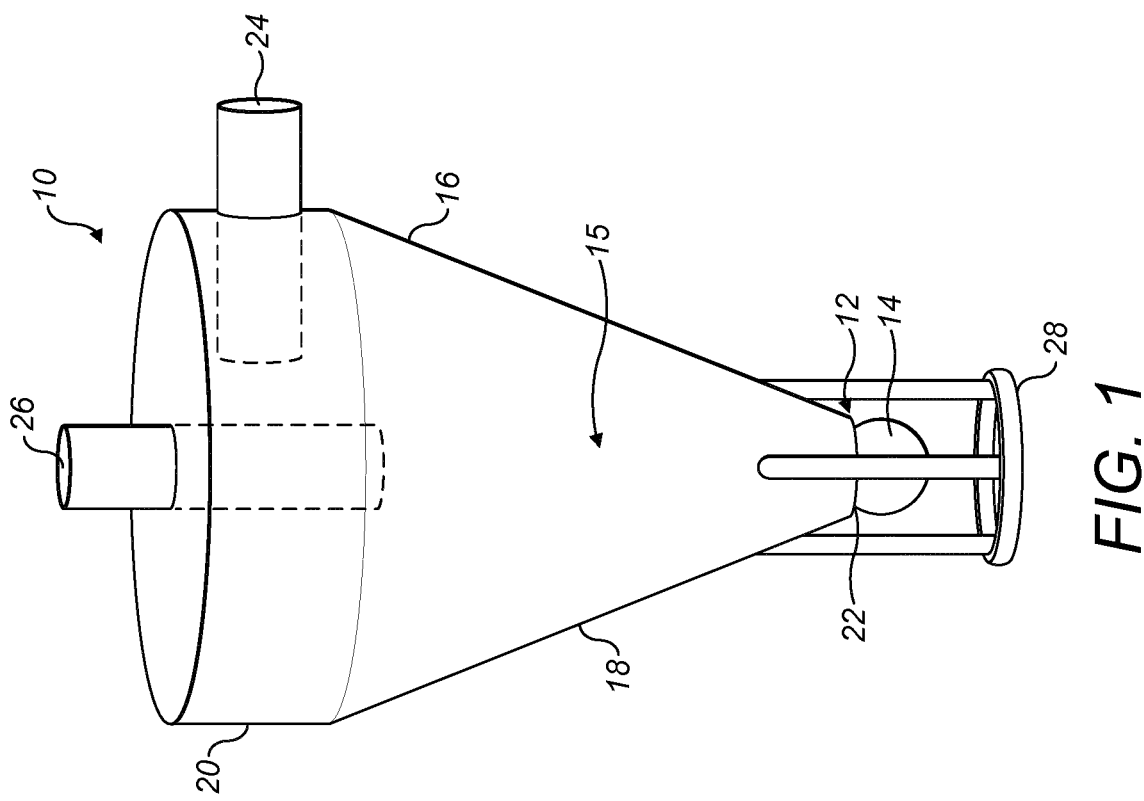

Embodiments of the present invention will now be described by way of example only and with reference to the accompanying drawings, in which:

FIG. 1 is a schematic view of the exterior a precleaner where the aperture is occluded in accordance with the present invention; and FIG. 2 is a schematic view of the exterior a precleaner where the aperture is open in accordance with the present invention.

FIG. 1 depicts the exterior of a precleaner 10 where the aperture 12 is occluded by a blocking member 14 in accordance with the present invention.

The precleaner 10 comprises a cyclone 16, where the cyclone 16 is a housing that substantially surrounds and defines a volume 15. The housing of the cyclone 16 is shaped such that it comprises two portions: a frustoconical portion 18 and a cylindrical portion 20. The interior surfaces of both the frustoconical portion 18 and cylindrical portion 20 are substantially smooth. The cylindrical portion 20 and its curved side walls extend from the base of the frustoconical portion 18. As such, the cylindrical portion 20 has substantially the same cross-sectional area as the base of the frustoconical portion 18.

The cross-section of the base of the frustoconical portion 18 and the cross-section of cylindrical portion 20 are both substantially circular. The height of frustoconical portion 18 and cylindrical portion 20 are defined to be perpendicular to the diameter of their bases. The height of the frustoconical portion 18 along its longitudinal axis is greater than the height of the cylindrical portion 20. The combined height of the cylindrical portion 20 and the frustoconical portion 18 is greater than the diameter of the cylindrical portion 20. As such, the longitudinal axis of the cyclone 16 extends centrally through both the frustoconical portion 18 and the cylindrical portion 20.

The frustum 22 of the frustoconical portion 18 comprises the aperture 12. As illustrated in FIG. 1, the cylindrical portion 20 and the aperture 12 are located at opposing ends of the cyclone 16, with the aperture 12 occupying substantially the entire frustum 22. As such, the aperture 12 is substantially circular and lies in a plane substantially perpendicular to the longitudinal axis of the cyclone 16. The aperture 12 allows fluid communication between the interior volume 15 of the cyclone 16 and the exterior of the cyclone 16.

The air that is to be cleaned by the precleaner 10 enters the volume 15 of the cyclone 16 by the inlet 24. The inlet 24 is a tube, pipe or hose that extends into the volume 15 of the cyclone 16 through its side walls. The inlet 24 is located substantially centrally along the height of the curved side wall of the cylindrical portion 20. The longitudinal axis of the inlet 24 and the direction of airflow through the inlet 24 are both orientated substantially perpendicular to the longitudinal axis of the cyclone 16.

The air that has been cleaned by the precleaner 10 and cyclone 16 leaves the volume 15 of the cyclone 16 by the outlet 26. The outlet 26 is a tube, pipe or hose that extends into the volume 15 of the cyclone 16 through one its side walls. The outlet 26 is located on the planar base of the cylindrical portion 20, and the centre of the outlet 26 aligns with the centre of the planar base of the cylindrical portion 20. The outlet 26 is orientated substantially perpendicular to the inlet 24 and substantially parallel to the longitudinal axis of the cyclone 16.

The outlet 26 and the aperture 12 are located on opposing surfaces on opposite sides of the cyclone 16. In fact, the outlet 26 and aperture 12 are situated at opposing ends of the cyclone 16. Both the outlet 26 and aperture 12 are centrally aligned with the longitudinal axis of the cyclone 16, such that the longitudinal axes of the cyclone 16 and the frustoconical portion 18 extend through both the outlet and aperture respectively. As such, when the tubing, piping or hosing of the outlet 26 extends into the volume 15, it extends towards the aperture 12. Here, the outlet 26 tube extends such a distance into the volume 15 of the cyclone 16 that it is closer to the aperture 12 than the inlet 24 tube.

The aperture 12 can be obscured, occluded, blocked, stoppered or plugged by a blocking member 14 located proximate to the aperture 12. The blocking member 14 is substantially spherical and ball-shaped and is located externally to both the volume 15 and the cyclone 16. The curvature and size of the blocking member 14 are designed and arranged to be such that the blocking member 14 can occlude the aperture 12. Here, the blocking member 14 completely occludes the aperture 12 to form a substantially airtight seal when air pressure at the outlet 26 is lower than the air pressure at the aperture 12. As the aperture 12 occupies the entire frustum 22, the perimeter of the aperture 12, defined by the side wall of the frustoconical portion 18, is abutted by the blocking member 14

The blocking member 14 is contained within a substantially cylindrical cage 28 located outside of the volume 15 of the cyclone 16. The cage 28 is constructed from a number of bars, the spacing between the bars large enough to allow the passage of air, dirt, debris and the like through the cage. However, the bars of the cage 28 are spaced such that the blocking member 14 is too large to pass through the spaces between them. As such, the blocking member 14 is retained close to the aperture 12 and cannot be removed from the cage 28.

As can be seen from FIG. 1, the maximum distance the cage 28 allows the blocking member 14 to move away from aperture 12 is less than the diameter of the aperture 12 and less than the largest dimension of the blocking member 14. Also, the maximum distance the cage 28 allows the blocking member 14 to move is in a direction parallel with the longitudinal axis of the cyclone 16. The blocking member 14 can only move a relatively small distance in any direction perpendicular to the longitudinal axis of the cyclone 16. As such, the majority of the freedom of movement of the blocking member 14 is towards and away from the aperture 12 in a direction perpendicular to the plane of the aperture 12 and parallel to the longitudinal axis of the cyclone 16.

In use, the outlet 26 of the precleaner 10 is connected to an air filter, the air filter itself connected to the air intake of an engine. When the engine is in operation, air pressure at the outlet 26 is lowered, and air enters the volume 15 of the cyclone 16 through the inlet 24. This air pressure differential between the aperture 12 and the outlet 26 of the precleaner 10 remains present whilst the engine is in operation.

Due to the position of the inlet 24 and the outlet 26, vortices are formed within the volume 15 of the cyclone 16. As such, debris and particles drawn into the precleaner 10 through the inlet 24 alongside the air is separated from the air by a process known as cyclonic separation or vortex separation. The shape of the cyclone 16, causes air entering the volume 15 to flow in a downward vortex, the entering air spiraling down the increasingly narrow frustoconical portion 18. The high-speed rotation of the airflow in volume 15 causes particulate matter in the air, in particular, larger and denser particulate matter, to collide with the walls of the cyclone 16 as the inertia of these particles results in their ejection from the increasingly tight downward vortex.

After this particulate matter is ejected from the downward vortex, it slides down the walls of the cyclone 16 towards the aperture 12 and blocking member 14. The air which has descended down the cyclone 16 within the downward vortex then ascends substantially centrally through the volume 15 towards the outlet 26 in an upward vortex. The cleaned air then leaves the precleaner and can continue to the engine via the air filter. The axes of the vortices formed within the cyclone 16 are substantially colinear with the longitudinal axis of the cyclone 16. As such, the axes of the vortices extend through both the outlet 26 and the aperture 12.

The flow of the air through the cyclone 16 causes the pressure inside the volume 15 of the cyclone 16 to be lower than the pressure outside the cyclone 16. As such, there is airflow through the aperture 12 which brings the blocking member 14 into contact with the aperture 12 such that the blocking member 14 occludes the aperture 12. The pressure differential between the volume 15 and the external environment outside of the cyclone 16 acts to fix and secure the blocking member 14 in a position where it occludes the aperture 12 by virtue of a suction force. Where the aperture 12 is occluded by the blocking member 14, the air pressure of the aperture 12 should be considered as the air pressure immediately proximate the aperture 12 inside the volume 15.

The suction force causes the blocking member 14 to move towards the aperture 12 such that the blocking member 14 occludes the aperture 12. The suction force acts upon the blocking member 14 as air moves from the external environment to the volume to equalise the pressure difference and the flow of air physically moves the blocking member 14 from rest to occlude the aperture 12.

Here, the blocking member 14 completely occludes the aperture to provide a substantially airtight seal. In other words, the occlusion of the aperture 12 by the blocking member 14 when air pressure at the outlet 26 is lower than the air pressure at the aperture 12 is substantially airtight. Also, when the aperture is occluded the air pressure at the outlet 26 is lower than the air pressure at the inlet 24. To occlude the aperture 12, the blocking member 14 moves substantially along the longitudinal axis of the cage 28.

As described previously, particulate matter separated from the air accumulates in the bottom of the cyclone 16. Namely, the particulate matter accumulates proximate the narrowest part of the frustoconical portion 18 and adjacent the aperture 12.

Referring to FIG. 2 there is depicted a schematic view of the exterior a precleaner where the aperture is open in accordance with the present invention. When airflow through the precleaner ceases, for example when the internal combustion engine that is being fed by the air intake system of which the precleaner is a part of is turned off, the pressure difference between the volume 15 and the exterior of the cyclone 16 decreases and equalises. The pressure holding the blocking member 14 in its occluding position weakens until gravity is the predominant force. At this point, where gravity is the predominant force, the blocking member 14 drops away from the aperture 12 such that the aperture 12 is no longer obscured. The aperture 12 is thus open. The aperture 12 is fully open when the blocking member 14 is at rest and in contact with the base of the cage 28.

When the aperture 12 opens, particulate matter that has accumulated proximate the aperture 12 can egress from the cyclone 16 through the aperture 12. This egress is under the influence of gravity, assisted by the sloped nature of the internal surfaces of the frustoconical portion 18. Due to the relatively large spacing of the wires which form the cage 28, the particulate matter is not confined within the cage. As such, when the aperture 12 is no longer occluded by the blocking member 14, the particulate matter empties from the precleaner 10 without any further user interaction.

The aperture 12 may also be opened when there is airflow through the precleaner 10 and cyclone 16. In use, the accumulated particulate matter can form a seal above the aperture 12. The seal is formed when the amount of accumulated particulate matter is great enough to reduce the suction force acting on the blocking member 14 when it is occluding the aperture 12. The combination of the reduction in suction force and the weight of the accumulated particulate matter acting on the blocking member 14 can displace the blocking member 14 from its occluding position of the aperture 12. This displacement can occur despite there being a flow of air between the inlet and outlet of the precleaner 10, that is, despite the precleaner being used and a pressure differential being present between the volume 15 and the external environment. In other words, the precleaner 10 can eject and egress accumulated particulate matter whilst still cleaning air passing through cyclone 16.

The displacement of the blocking member 14 results in the egress of the accumulated particulate matter through the aperture 12. The removal of particulate matter from the volume 15 results in an increased suction force acting on the blocking member 14. Also, where particulate matter is removed, there is less weight acting on the blocking member 14. After the egress of the particulate matter, the blocking member 14 can then move back to occlude the aperture 12. This movement back towards the aperture is facilitated by the suction force generated by the pressure differential between the volume 15 of the cyclone 16 and the exterior of the cyclone 16.

In use, the precleaner 10 is installed, positioned and orientated such that force of gravity acts to move the blocking member 14 away from the position where it is occluding the aperture 12 to a position where it is abutting the cage 28 and the aperture 12 is open. As such, in rest or in when there is no airflow through the cyclone the aperture 12 is open.

The invention claimed is:

1. A precleaner for use in an air intake system, said precleaner comprising:
   a cyclone defining a volume, said cyclone comprising an inlet and an outlet,
   said inlet and said outlet arranged to generate a vortex within said volume when the air pressure at said outlet is lower than the air pressure at said inlet,
   said cyclone further comprising an aperture, and
   said precleaner further comprising a blocking member arranged to move and concomitantly occlude said aperture when the air pressure at said outlet is lower than the air pressure at said aperture
   wherein said blocking member is held proximate said aperture by a cage which surrounds said aperture; and said blocking member and said cage are located outside said volume of said cyclone, wherein said blocking member is a ball and wherein bars of the cage are spaced such that the block member cannot pass through the spaces between the bars.

2. The precleaner of claim 1, wherein, in use, said aperture is located below said inlet and said outlet.

3. The precleaner of claim 1, wherein said cyclone comprises a frustoconical portion.

4. The precleaner of claim 3, wherein said aperture is located on the frustum of said frustoconical portion.

5. The precleaner of claim 1, wherein said aperture is located on the longitudinal axis of said cyclone.

6. The precleaner of claim 1, wherein said outlet is located on the longitudinal axis of said cyclone.

7. The precleaner of claim 1, wherein said aperture and said outlet are located on opposite sides of said cyclone.

8. The precleaner of claim 1, wherein said blocking member is arranged to completely occlude said aperture when air pressure at said outlet is lower than the air pressure at said aperture.

9. The precleaner of claim 8, wherein the obscuration of said aperture by said blocking member when air pressure at said outlet is lower than the air pressure at said aperture is airtight.

10. The precleaner of claim 1, wherein, said blocking member is arranged to move and concomitantly occlude said aperture when the air pressure at said outlet is lower than the air pressure at said aperture under the influence of air passing through said aperture.

11. The precleaner of claim 1, wherein said cyclone comprises at least one of a frustoconical portion and a cylindrical portion.

12. The precleaner of claim 11, wherein said cylindrical portion extends from the widest part of said frustoconical portion.

13. The precleaner of claim 11, wherein said inlet and said outlet are located on the cylindrical portion of the cyclone.

14. The precleaner of claim 1, wherein said inlet and said outlet comprise tubes which extend into said volume of said cyclone.

15. The precleaner of claim 1, wherein said inlet and said outlet are perpendicular to one another.

16. The precleaner of claim 1, wherein plane occupied by the aperture is perpendicular to the longitudinal axis of the cyclone.

17. An air intake system comprising the precleaner of claim 1.

* * * * *